United States Patent
Covizzi et al.

(10) Patent No.: US 10,280,014 B2
(45) Date of Patent: May 7, 2019

(54) PLANTS FOR THE IMMERSION TREATMENT OF BODYWORKS

(71) Applicant: Geico S.p.A., Cinisello Balsamo (IT)

(72) Inventors: Giampaolo Covizzi, Cinisello Balsamo (IT); Paolo Colombaroli, Cinisello Balsamo (IT)

(73) Assignee: GEICO S.p.A. (IT)

( * ) Notice: Subject to any disclaimer, the term of this patent is extended or adjusted under 35 U.S.C. 154(b) by 0 days.

(21) Appl. No.: 15/101,227

(22) PCT Filed: Dec. 16, 2014

(86) PCT No.: PCT/IB2014/066978
§ 371 (c)(1),
(2) Date: Jun. 2, 2016

(87) PCT Pub. No.: WO2015/092685
PCT Pub. Date: Jun. 25, 2015

(65) Prior Publication Data
US 2016/0297623 A1    Oct. 13, 2016

(30) Foreign Application Priority Data
Dec. 20, 2013   (IT) ............... MI2013A2152

(51) Int. Cl.
*B05C 3/09* (2006.01)
*B65G 49/04* (2006.01)

(52) U.S. Cl.
CPC ............ *B65G 49/0481* (2013.01); *B05C 3/09* (2013.01); *B65G 49/0413* (2013.01);
(Continued)

(58) Field of Classification Search
CPC ... B05C 3/09; B65G 49/0459–49/0463; B65G 49/0413
See application file for complete search history.

(56) References Cited

U.S. PATENT DOCUMENTS 5,110,440 A * 5/1992 Case ............... B65G 49/0454
                                                        118/416
8,297,905 B2 * 10/2012 May ............... B65G 65/23
                                                        414/649
(Continued)

FOREIGN PATENT DOCUMENTS

DE      10054366 A1 *  5/2002
DE      10054366 A1    5/2002
(Continued)

OTHER PUBLICATIONS

Italian Search Report for Application No. MI2013A002152 dated Sep. 11, 2014.

*Primary Examiner* — Binu Thomas
(74) *Attorney, Agent, or Firm* — MH2 Technology Law Group LLP

(57) ABSTRACT

A plant for clip-treatment of bodies may include: at least one skid configured to support a body to be treated; at least one tank; a transportation line; and/or a system for overturning and immersing the body on the at least one skid which has been positioned above the at least one tank using the line. The line may include travel ways arranged along lateral edges of the at least one tank. The at least one skid may include lateral mounting elements which rest on the ways for supporting and moving the at least one skid above the at least one tank. The overturning and immersing system may include, on the at least one skid, a support for the body rigidly connected to a shaft transverse to the line, and which is configured to overturn the body between a first position and second position immersed inside the at least one tank.

20 Claims, 7 Drawing Sheets

(52) U.S. Cl.
CPC ..... *B65G 49/0459* (2013.01); *B65G 49/0463* (2013.01); *B65G 2201/0294* (2013.01)

(56) References Cited

U.S. PATENT DOCUMENTS

| | | |
|---|---|---|
| 2005/0139451 A1 | 6/2005 | Kreuzer et al. |
| 2010/0200361 A1* | 8/2010 | Tagliavento ....... B65G 49/0463 198/346.3 |
| 2010/0326832 A1 | 12/2010 | Albeck et al. |
| 2011/0017132 A1 | 1/2011 | Robbin |
| 2012/0006260 A1* | 1/2012 | Nishihara .......... B65G 49/0481 118/423 |
| 2012/0006261 A1* | 1/2012 | Nishihara .......... B65G 49/0459 118/426 |
| 2014/0190406 A1* | 7/2014 | Covizzi ................ B65G 49/049 118/426 |
| 2014/0314963 A1* | 10/2014 | Covizzi .............. B65G 49/0459 118/423 |
| 2014/0374214 A1* | 12/2014 | Nishihara .......... B65G 49/0459 198/339.1 |

FOREIGN PATENT DOCUMENTS

| | | |
|---|---|---|
| EP | 2192989 | 6/2010 |
| WO | WO-03/070545 A1 | 8/2003 |
| WO | WO-2009-028006 A1 | 3/2009 |
| WO | WO-2009/083081 A1 | 7/2009 |
| WO | WO-2009/103400 A1 | 8/2009 |
| WO | WO-2012/146487 A1 | 11/2012 |

\* cited by examiner

PLANTS FOR THE IMMERSION TREATMENT OF BODYWORKS

CROSS-REFERENCE TO RELATED APPLICATION(S)

This application is a national stage entry from International Application No. PCT/IB2014/066978, filed on Dec. 16, 2014, in the Receiving Office of the International Bureau of the World Intellectual Property Organization ("WIPO") and published as International Publication No. WO 2015/092685 A1 on Jun. 25, 2015, which claims priority from Italian Patent Application No. MI2013A002152, filed on Dec. 20, 2013, in the Italian Patent and Trademark Office, the entire contents of both of which are incorporated herein by reference.

The present invention relates to a plant for the dip-treatment of bodyworks, in particular motor vehicle bodies, which are transported sequentially by means of skids along one or more treatment tanks.

In the art systems for the dip-treatment of bodyworks inside suitable liquids, in order to perform for example anti-corrosive and cataphoresis pre-treatments, are well-known. Over time various types of plants which allows sequential transportation and immersion of bodyworks in treatment tanks have been proposed.

In the various known systems the presence of the transportation and immersion system, however, results in the need for relatively wide tanks with wastage of process liquid and space within the plant. Moreover, the location of the transportation and immersion system above and inside the tank gives rise to problems both of reliability and cleanliness (since the system is exposed to the process liquids) and of contamination of the process liquids owing to the possible presence of dirt particles transported above and inside the tank by the same skid transportation system. The normal wear of the transportation system also produces particles which may fall into the process liquid when the system passes above the treatment tank.

For example, a known plant envisages the use of a skid transportation line which along its travel path has different heights so as to be completely immersed in one or more treatment tanks. In this way the bodies follow the progression of the transportation line and enter and exit from the tanks along the path in a gradual manner. In addition to the aforementioned problems of cleanliness and contamination of the liquids inside the tanks, this system has the drawback of being very slow and requiring very long tanks in order to allow the entry, exit and dip-treatment of the transported body, with consequent problems as regards both the size of the plant and the need for large quantities of process liquids.

DE10054366 describes a system which has a relatively complex transportation frame with a rotatable part which at the start of a tank is engaged by a motor located alongside the tank in order to overturn the body which thus proceeds immersed along the tank. At the end of the tank a second motor engages with the rotatable part in order to straighten up the body again. Transportation of the frame along the plant is performed by means of chains and the engagement of the motors occurs frontally by means of an axial movement of the entire motor via a special actuator. Centring of the rotational axes is relatively difficult and imprecise. Moreover, the rotating part must be locked in position by means of a further controlled device. The system is therefore relatively complex, inflexible and unreliable as regards operation.

WO2009/083081 and WO2009/103400 proposed the use of an overhead transportation assembly which travels above the tanks and is equipped with a plurality of carriages with elevator arms which extend downwards and terminate in a support which is rotatable about a horizontal axis and to which the body is attached. The transportation line thus does not enter into the liquid, but the plant is bulky and in any case only has an average productivity. Furthermore, the operations for loading and unloading the bodies onto/from the suspended rotating support are necessarily slow and the transportation system assembly continues to pass above the vertical axis of the tanks.

EP 2192989 proposed using a platform supported at the corners by four columns each provided with an independent elevator, such that the platform moves only vertically and may be inclined by means of an independent control system for the four elevators. A horizontal transportation system projects above the tank for loading and unloading the platform and then retracts so that the platform, owing to the separate control of the four elevators, may immerse vertically the body with various inclinations, variable depending on the body treated.

WO2012/146487 describes a similar station, but with only one or two columns which support a motor-driven shaft for rotation of the vertical-movement platform which raises and rotates the body.

Both the solutions are effective, but nevertheless have a certain cost and size owing to the four independent elevators or one or two columns and the transportation system for performing loading and unloading, which must be able to be positioned along the vertical axis of the tank.

WO 03/070545 describes a plant with a horizontal transportation line which has zones for downwards rotation of the bodies opposite the treatment tanks. Each body is mounted projecting from a transportation unit which comprises a lateral travel way. In this plant, however, immersion is difficult to control. Moreover, the transportation unit is complex, bulky and heavy and is subject to not insignificant stresses owing to the projecting structure. In view of the form of the transportation unit it moreover cannot be easily used for transportation of the bodies along the entire plant without the wastage of space and materials and therefore requires systems for loading and unloading the bodies in the vicinity of the tank.

US2012006260 describes a station which comprises a platform which engages with an entire transportation carriage of a body and overturns it forwards inside a tank and then withdraws it at the end of treatment. The system is complex and not suitable for an in-line transportation system for the fast sequential treatment of bodies.

The general object of the present invention is to overcome the problems of the prior art by providing a dip-treatment plant which ensures relatively low costs and small volumes with good flexibility, quality of treatment and reliability.

In view of this object the idea which has occurred is to provide, according to the invention, a plant for the dip-treatment of bodies, comprising: at least one skid intended to support a body to be treated; at least one process liquid tank; a line for transporting the skid; a system for overturning and immersing the body on the skid which has been positioned above the tank by means of the transportation line; and characterized in that the transportation line comprises parallel travel ways which are arranged along the outside of two lateral edges of the tank and the skid comprises, on its two opposite corresponding sides, lateral mounting elements which rest on the parallel travel ways for supporting and moving the skid above the tank.

Advantageously, the overturning and immersion system comprises on the skid a support for the body, which is rigidly connected to a shaft arranged transverse to the transportation line and which is rotatable about an axis so as to overturn the body between a first upper advancing position and a second lower position immersed inside the tank. The overturning and immersion system further comprises a motor unit for controlled rotation of the shaft, which is arranged on the outside of the tank along one of the two lateral edges of the tank and which is provided with coupling means for connection to the shaft of the skid, situated over the tank, for external rotational operation of the shaft about the axis so as to produce the movement of the body between the first and second positions.

A plant according to the invention is provided in accordance with Claim 1.

In order to illustrate more clearly the innovative principles of the present invention and its advantages compared to the prior art, an example of embodiment applying these principles will be described below with the aid of the accompanying drawings. In the drawings.

Figure 1:
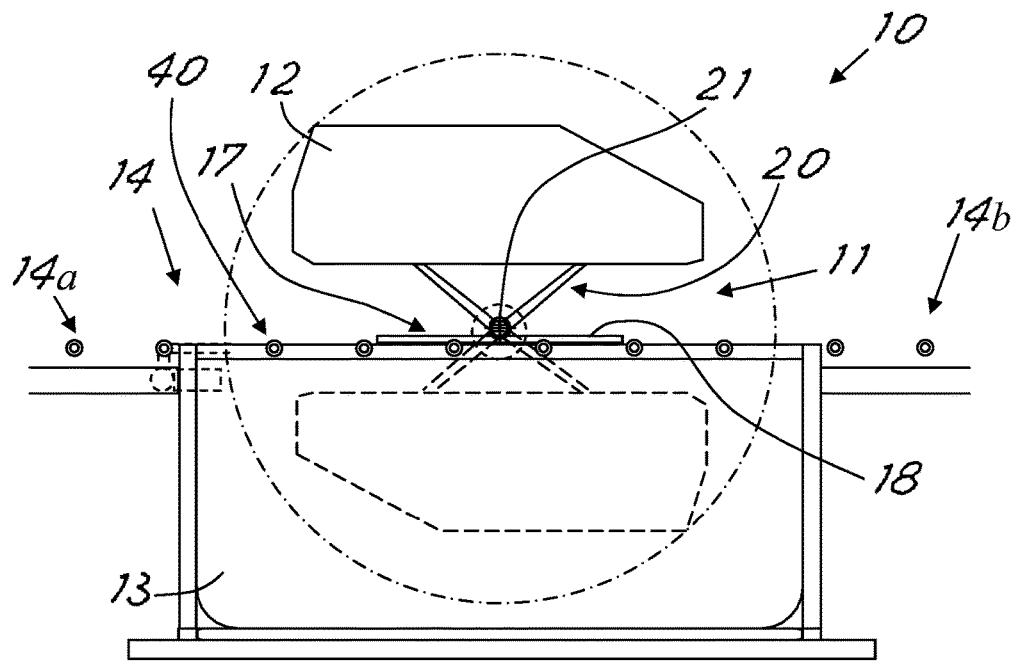
FIG. 1 shows a schematic side elevation view of a first embodiment of a treatment plant according to the invention.

With reference to the figures, FIG. 1 shows in schematic form a first example of a plant for the dip-treatment of bodies, denoted generally by 10, as provided in accordance with the invention.

The plant 10 comprises at least one skid 11 intended to support a body 12 to be treated. Usually the skids will consist of a plurality circulating along the plant, each skid with its own body to be treated.

The plant also comprises at least one process liquid tank 13 inside which the body must be immersed, for example for an anti-corrosive and cataphoresis pre-treatment. Although in the description reference will be made to a tank, it is clear that the tanks may be more than one arranged along the plant.

The plant also comprises a transportation line 14 for the sequential transportation of the skids along the plant and above the tanks. The transportation line may for example be designed with motor-driven rollers on which the skids rest and slide. As can be clearly seen in FIG. 2, the transportation line 14 has an entry section 14a upstream of one end of the tank, an exit section 14b downstream of the other end of the tank and, at least along the section coinciding with the tank, comprises parallel travel ways 40 and 41 which are arranged along the outside of the two lateral edges 15, 16 of the tank.

The skid 11 comprises in turn a base frame 17 with lateral mounting elements or runners 18, 19 which are arranged on its two corresponding opposite sides and which rest on the motor-driven parallel travel ways 40, 41 for supporting and moving the skid along the tank. The skid is therefore designed so as to be wider than the tank. The entire transportation line may be designed with a single width and the skids may rest with the runners 18, 19 on the transportation line also outside of the zones with the tanks.

The travel ways may be advantageously designed with a series of motor-driven rollers. For example, these rollers of each travel way may be all connected to a single motor by means of a chain system, as may be easily imagined by the person skilled in the art and as may be deduced from the figures. Entry and exit sections 14a and 14b may also be present on said structure.

With a system of rollers which have sections motor-driven separately before, after and/or inside the station it is possible to obtain an asynchronous transportation of the bodies, with the bodies which are able to move independently on the rollerways with a variable speed and variable interval between the bodies.

The plant further comprises a motor-driven system for overturning and immersion of the body on a skid which has been positioned above the tank by means of the transportation line 14.

Figure 3:
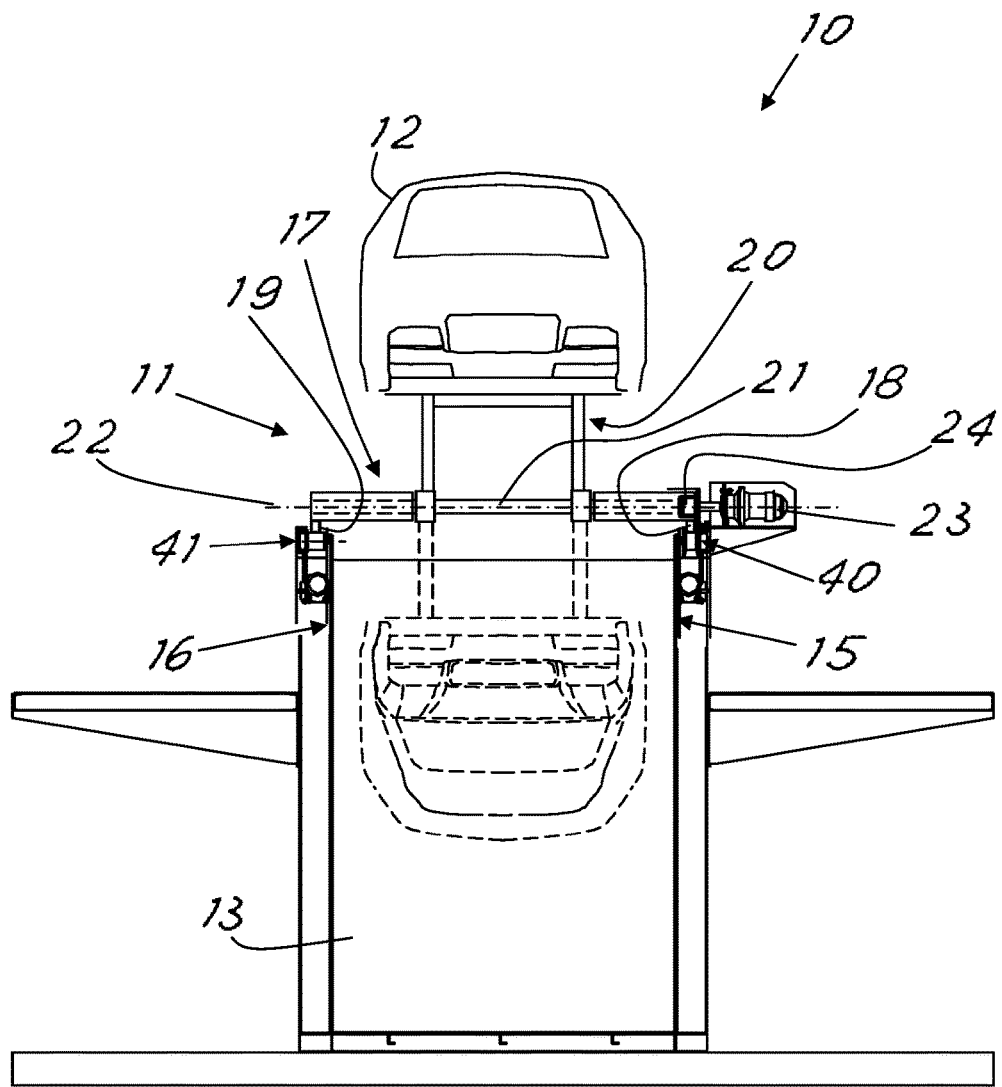
FIG. 3 shows a schematic cross-sectional view along the line III-III of FIG. 2.

The overturning system comprises on each skid 11 a support 20 which is provided with known systems for attachment to the bottom part of the body to be treated and which is rigidly connected to a shaft 21 supported transversely above the base frame 17 so as to be axially rotatable about an overturning axis 22 transverse to the transportation line. As can be clearly seen in FIGS. 1 and 3, by rotating the support 20 about the axis 22, the body may be displaced from a first upper position, where it is normally moved forwards along the plant, into a second lower overturned portion for immersing the body inside the tank.

Figure 2:
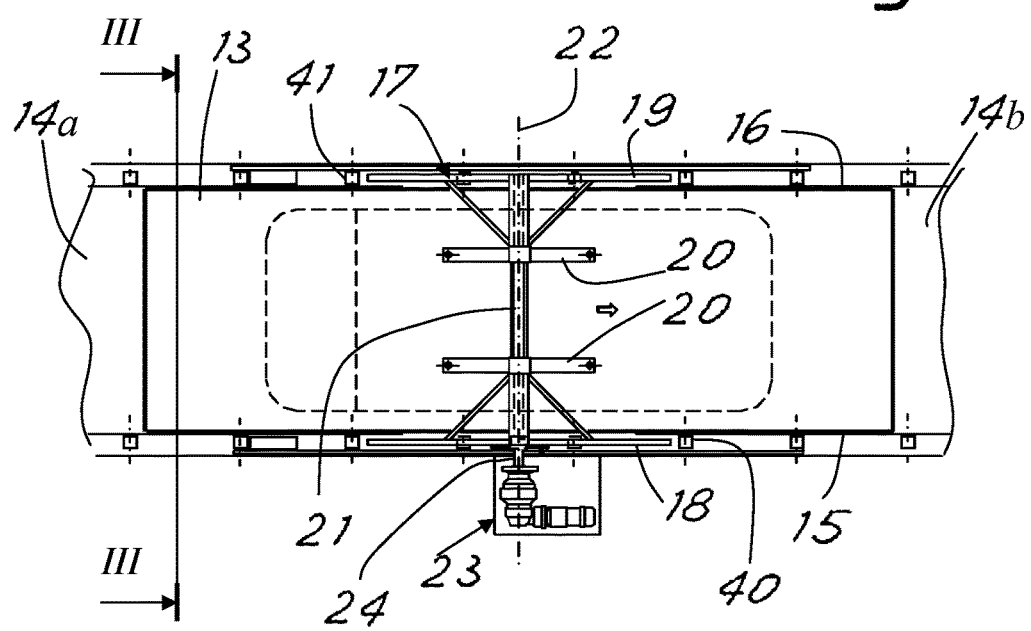
FIG. 2 shows a schematic plan view of the plant according to FIG. 1.

Advantageously, as can be clearly seen in FIG. 2, the base frame of the skid has an H-shaped form in plan view, with the sides of the H formed by the runners 18 and 19 and the cross-piece which comprises or is formed by the rotatable shaft 21 and its associated supports on the frame, so as to facilitate the transfer movement and rotation of the body, which is narrower than the distance between the runners 18 and 19. As can be clearly seen in FIG. 2, support elements, which are advantageously V-shaped, extend from the rotatable shaft and are directed upwards in the normal transportation position for forming the support 20.

A motor unit 23 is arranged on the outside of the tank 13 along a lateral edge of said tank and is provided with coupling means which comprise a coupling element 24 for connection to a complementary coupling element 25 of the shaft 21 of a skid which reaches the suitable position above the tank, so as to be able to perform, from outside the tank, the rotation of the shaft 21 about the overturning axis. Advantageously, the coupling means automatically connect the overturning shaft to the motor unit when they move towards each other from a predetermined direction.

In this way, a skid may be transported by the motor-driven travel ways 40 and 41 until its shaft 21 engages with the motor unit 23. The motor unit may then be operated so as to overturn the body with the predetermined speeds and amplitudes of movement which are also complex.

For example, the movement may consist of both complete overturning and oscillation of the overturned body, so as to favour evacuation of the air bubbles and the full contact of the body with the treatment liquid. The movement may moreover consist of a 360° movement (with a pause, if necessary, for a predetermined time when the body is completely immersed) or may also consist of an outward and return movement of the body between the two upper and lower positions, or also combinations of these movements, as may be easily imagined by the person skilled in the art.

In the embodiment shown in FIG. 1, the motor unit advantageously engages with the shaft of the skid when the skid reaches with its shaft a position halfway along the length of the tank. This allows the length of the tank to be kept as small as possible.

Once the immersion treatment has been terminated, the body is brought back into the upper position and the skid may continue along the transportation line for any further processing operations.

Figure 4:
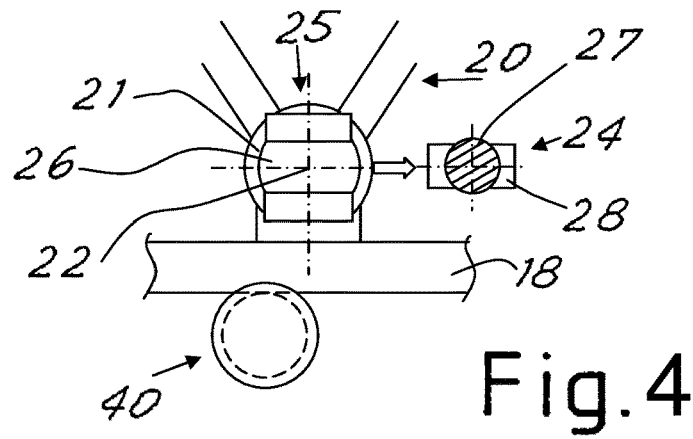
FIGS. 4 and 5 show enlarged schematic views, in two positions, of a coupling and rotation device in the plant according to FIG. 1.

FIG. 4 shows an enlarged view of a preferred embodiment of the coupling elements 24, 25 for connecting together motor unit and rotational shaft of the skid.

In particular, on the side of the tank where the motor unit is present, the shaft 21 terminates at its end with a seat 26 which is open in the direction transverse to the axis of the shaft in order to define a straight channel which, when the support 20 for the body is in the upper position, is located oriented parallel to the direction of sliding of the skid on the travel ways.

The motor unit 23 has a drive shaft 27 with, at the free end, an engaging insert or element 28 designed to complement the seat 26.

Figure 5:
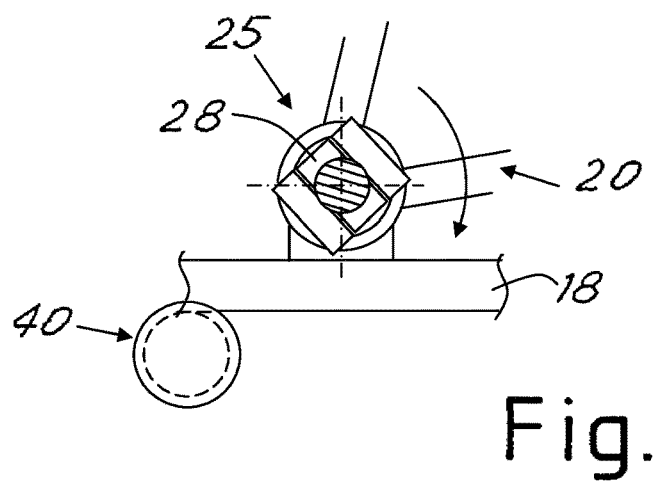

The engaging element 28 and the seat 26 are arranged so that, with the movement of the skid along the travel ways (as indicated by the arrow in FIG. 4), the element 28 enters slidingly into the seat 26 through the opening of the seat 26 which is situated at the front with respect to the direction of movement of the skid. The predetermined direction of engagement is therefore in this case parallel to the direction of movement of the skid on the travel ways. Once the overturning axis 22 of the body is located aligned with the axis of the drive shaft 27, the transportation of the skid may be interrupted and the motor unit 23 may rotate the shaft 21 of the skid as schematically shown in FIG. 5. Once the dip-treatment has been completed, the motor unit repositions the body in the upper transportation position and the transportation system is reactivated so that the skid continues along its travel path towards the exit 14b and the engaging element 28 is automatically disengaged from the seat 26 through the lateral opening of the seat which is situated at the rear with respect to the direction of movement of the skid.

In order to prevent uncontrolled rotation of the shaft 21 when the shaft is not engaged with the motor unit, advantageously a device for locking rotation of the shaft may be provided, said device being disabled when the shaft is engaged by the motor unit.

Figure 6:
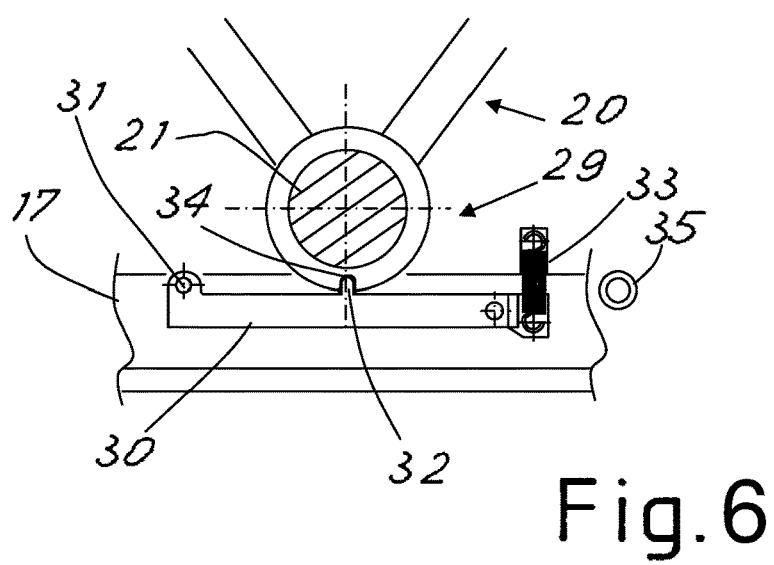
FIG. 6 shows an enlarged schematic view a device for locking rotation in the plant according to FIG. 1.

FIG. 6 shows for example in schematic form a possible advantageous mechanical locking device 29 which comprises a lever 30 pivotably mounted at 31 on the frame of the skid and provided with an engaging finger 32 which, owing to the action of a spring 33, is inserted inside a complementary peripheral seat 34 present on the shaft 21 so as to lock it. The seat 34 and the finger 32 are arranged relative to each other such that the engagement occurs when the skid support in its upper position.

A cam element 35 is arranged on one side of the tank (for example attached to a support of the motor unit) so as to displace the lever 30 against the action of the spring 33 and disengage the finger 32 from the seat 34 when the coupling elements 24 and 25 are engaged with each other.

In this way, when the skid reaches the overturning position above the tank, the overturning shaft is engaged by the motor unit and is automatically released from the locking device and when the skid leaves the overturning position the shaft 21 is again automatically locked by the locking device before the overturning shaft is completely released from the motor unit.

Figure 7:
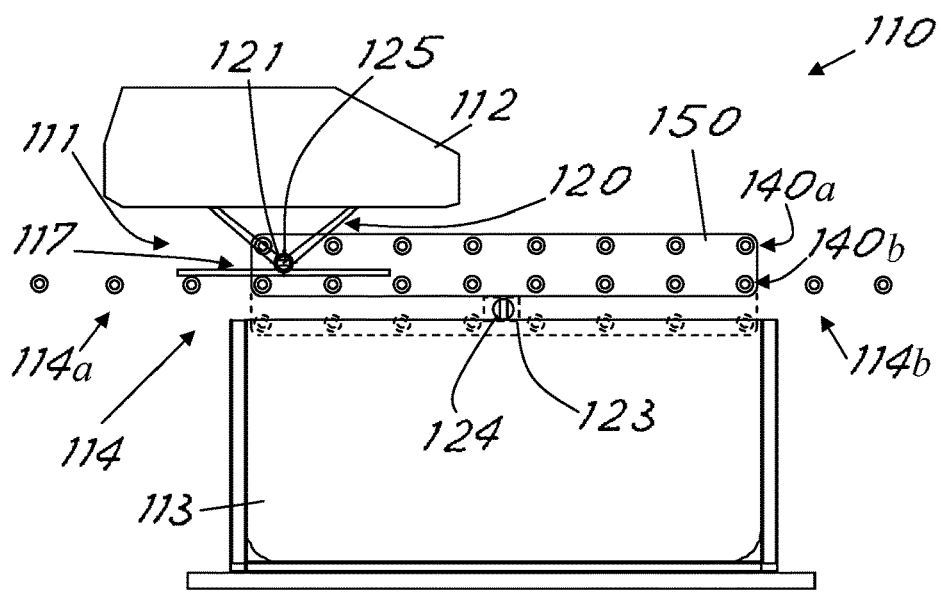
FIGS. 7 and 8 show schematic side elevation views of a second embodiment of a treatment plant according to the invention.

FIG. 7 shows a second embodiment of the plant, denoted generally by 110, according to the invention.

For the sake of easier description, parts of the second embodiment similar to those of the first embodiment will be indicated by means of the same numbering increased by 100.

In a similar manner to the plant 10, the plant 110 comprises at least one skid 111 (and, advantageously, a plurality of skids) intended to support a body 112 to be treated, at least one process liquid tank 113 inside which the body must be immersed and a transportation line 114 for the sequential transportation of the skids along the plant and above the tanks. The transportation line may for example be designed with motor-driven rollers on which the skids rest and slide. The skids 111 are similar to the skids 11.

As in the preceding embodiment, the transportation line 114 comprises an entry section 114a and an exit section 114b and, at least along the section coinciding with the tank, parallel travel ways 140 and 141 which are arranged along the outside of the two lateral edges 115, 116 of the tank.

The skids 111 comprise in turn a base frame 117 with lateral mounting elements or runners 118, 119 which rest on the parallel travel ways for supporting and moving the skids along the tank.

Compared to the preceding embodiment, the travel ways 140, 141 on each side of the tank are two in number, arranged above each other, as indicated by 140a, 140b and 141a, 141b, respectively, and mounted integrally on a vertical-movement frame 150 so as to form two pairs of travel ways 140a, 141a and 140b and 141b, arranged above each other. The travel ways may for example be designed again with aligned rows of motor-driven rollers.

The frame 150 may be moved vertically, upon command, so as to align the lower travel ways 140b, 141b (FIG. 7) or the upper travel ways 140a, 141a (FIG. 8) with the entry and exit sections 114a, 114b of the transportation line.

Figure 8:
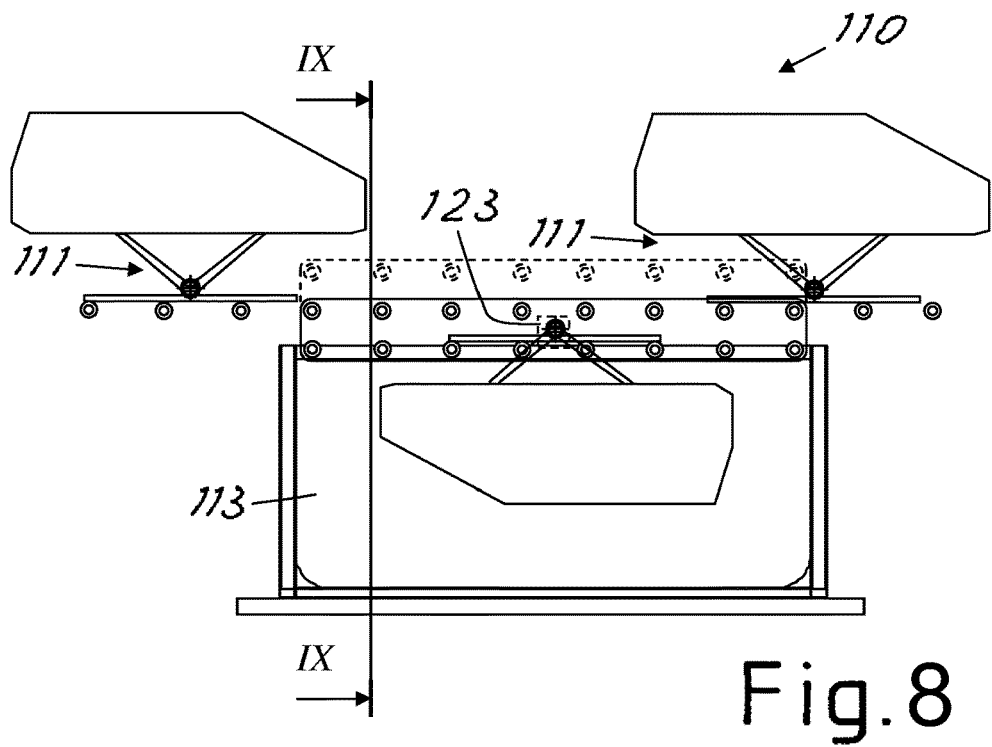
Figure 9:
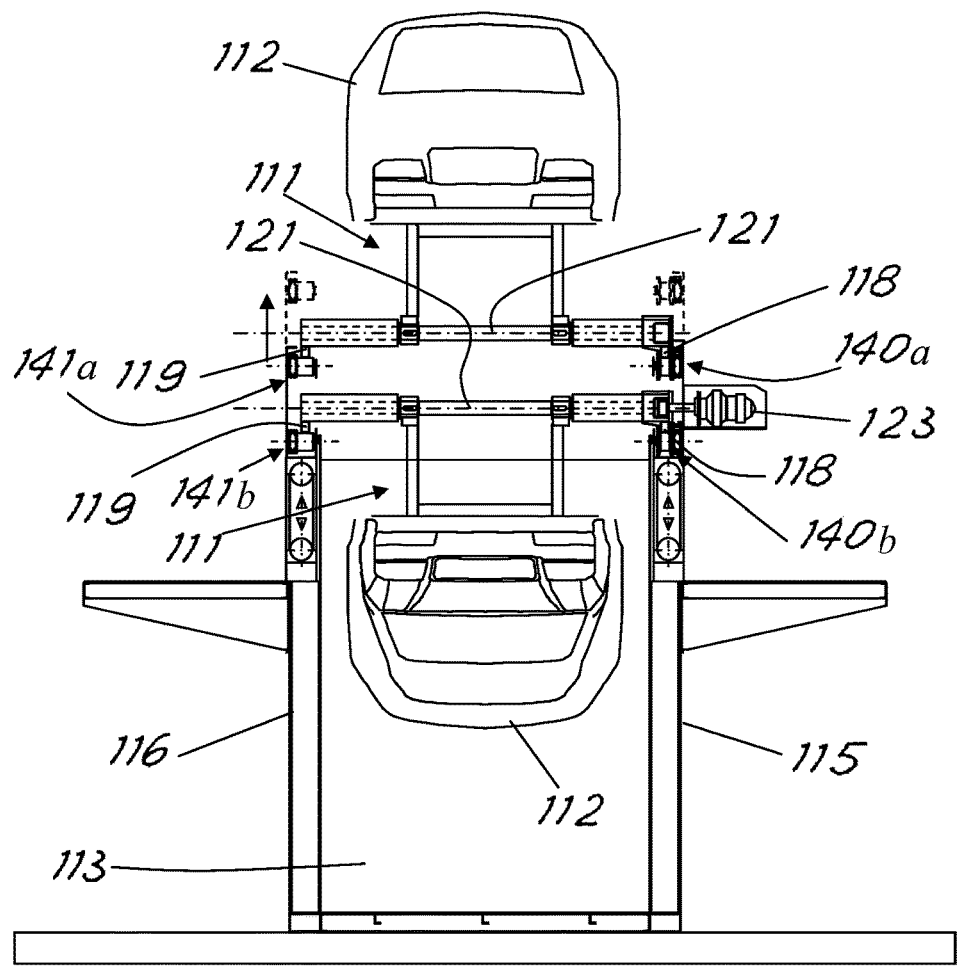
FIG. 9 shows a schematic cross-sectional view along the line IX-IX of FIG. 8.

An incoming skid may thus be selectively loaded on the lower travel ways or upper travel ways, as can be seen in FIGS. 7 and 8.

The lower travel ways form an operational path on which the skid arrives in order to immerse the body inside the tank, in a manner similar to that described for the first embodiment.

The upper travel ways instead form a path for by-passing the tank, on which the skid arrives so as to be able to pass beyond the tank and continue into the exit section 114b even when the tank is already occupied with a body which is undergoing treatment.

As a result, it is possible to have, for example, two tanks arranged in sequence along the transportation line and a skid may be directed towards the second tank when the first tank is already occupied.

The system for overturning and immersion of the body on a skid is in any case advantageously similar to that previously described and comprises on each skid 111 a support 120 on which the body to be treated is mounted and which is rigidly connected to a shaft 121 supported above the base frame 117 transversely with respect to the skid so as to be rotatable about an overturning axis 122 which is transverse to the transportation line.

A motor unit 123 is arranged on the outside of the tank along a lateral edge of the tank and is provided with coupling means which comprise a coupling element 124 for connection together with a complementary coupling element 125 of the shaft 121 of the skid which reaches the overturning position. The coupling elements may be similar to those described with reference to FIGS. 4 and 5.

Advantageously, in order to engage the motor unit with the shaft for overturning the skid, the vertical movement of the travel ways may be used as may be imagined from a comparison of FIGS. 7 and 8. In other words, the predetermined direction of engagement is in this case the vertical direction.

Figure 10:
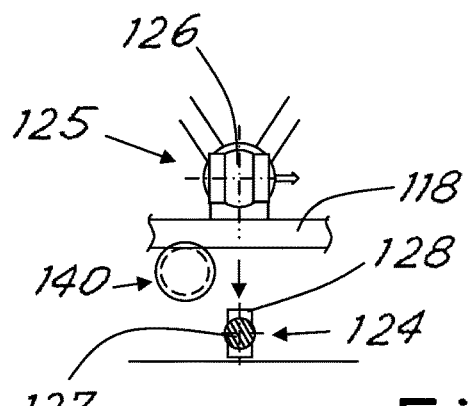
FIG. 10 shows an enlarged schematic view of a coupling and rotation device in the plant according to FIG. 9.

In this case, as can be clearly seen in FIG. 10, the coupling system is formed rotated through 90° with respect to the coupling system shown in FIG. 4 and the transverse channel formed by the seat 126 of the coupling element 125 is thus located vertical when the skid support frame is in the upper advancing position.

The engaging element 128 of the drive shaft 127 may thus enter inside the seat 126 owing to the vertical movement of the travel ways produced by the displacement performed by the support frame 150.

During use, as can be schematically seen in FIG. 7, with the travel ways in the upper position, a skid is loaded onto the lower travel ways and moved forwards until the coupling element of the shaft 121 is located vertically aligned with the coupling element of the motor unit 123. The travel ways are then lowered and the overturning shaft therefore engages inside the shaft of the motor unit. In this condition the motor unit may perform overturning of the body about the axis 122 in accordance with a programmed treatment cycle.

With the body overturned downwards, the upper travel ways are free and aligned with the entry and exit sections 114a and 114b of the transportation system. If other skids arrive along the transportation system, these skids are therefore directed onto the travel ways 140a and may pass over the tank and continue towards the exit, as schematically shown in FIG. 8.

Once the upper travel ways have been freed and after completion of the treatment of the body on the skid present on the lower travel ways, the body is rotated again into its upper position and the travel ways are raised again, disconnecting the overturning shaft from the motor unit. The travel ways may thus be operated so as to transport the skid with the treated body towards the exit 114b.

In order to prevent uncontrolled rotation of the shaft 121 when the shaft is not engaged with the motor unit, advantageously a device for locking rotation of the shaft may again be provided on the skid, said device being disabled when the motor unit is engaged with the overturning shaft. This device may be for example similar to that used in the preceding embodiment, but with disabling controlled by the vertical engaging movement of the overturning shaft with the motor unit. Such a system may now be easily imagined by the person skilled in the art and therefore is not shown or described here in further detail. For example, said system may be similar to that shown in FIG. 6, but rotated through 90° so as to be activated by a relative vertical movement of lever and actuating cam.

Figure 11:
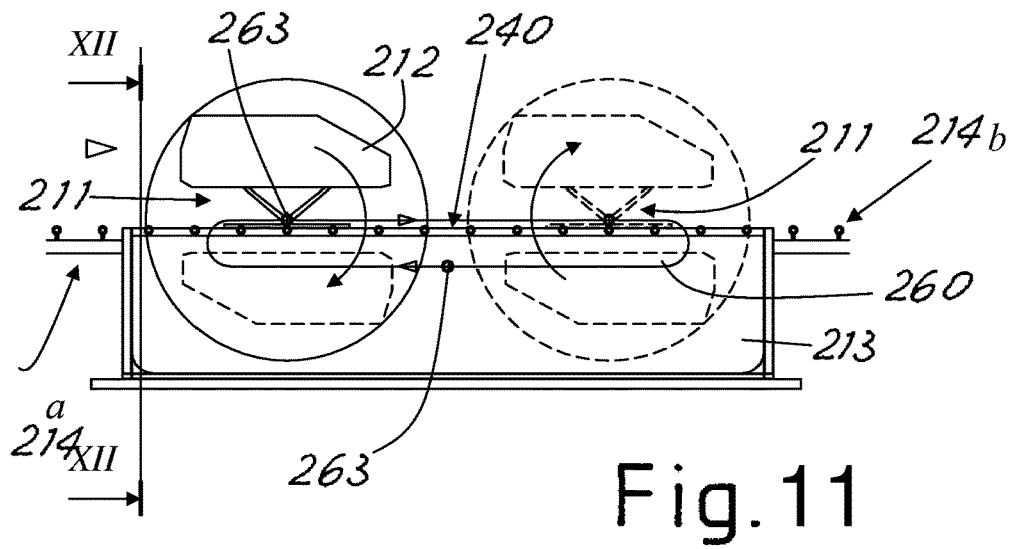
FIG. 11 shows a schematic side elevation view of a third embodiment of a treatment plant according to the invention.
Figure 12:
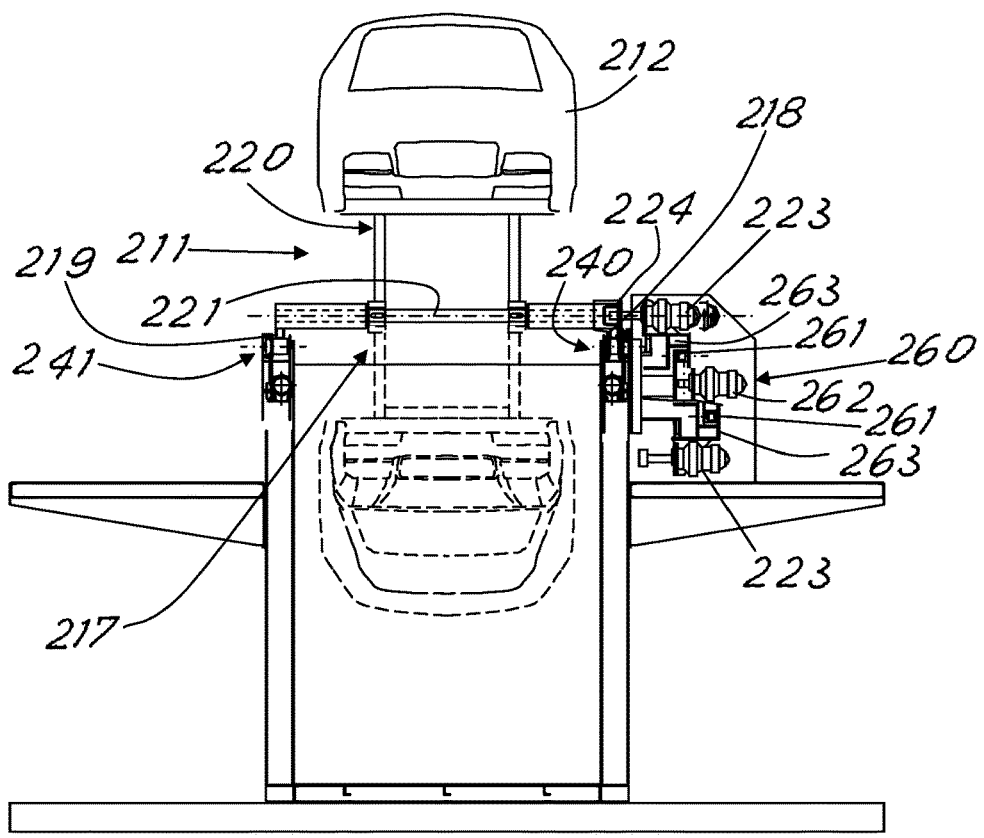
FIG. 12 shows a schematic cross-sectional view along the line XII-XII of FIG. 11.

FIGS. 11 and 12 show a further example of embodiment of a plant according to the invention, indicated generally by 210.

For convenience, parts of this further embodiment similar to parts of the first embodiment will be indicated by the same numbering increased by 200.

In a similar manner to the plant 10, the plant 210 comprises at least one skid 211 (advantageously a plurality of skids) intended to support a body 212 to be treated, at least one process liquid tank 213 inside which the body must be immersed and a transportation line 214 for sequential transportation of the skids along the plant and above the tanks. The transportation line may for example be designed again with motor-driven rollers on which the skids rest and slide. The skids 211 are similar to the skids 11.

As in the preceding embodiments, the transportation line 214 comprises an entry section 214a and an exit section 214b and, at least along the section coinciding with the tank, parallel travel ways 240 and 441 which are arranged along the outside of the two lateral edges 215, 216 of the tank.

The skids 211 comprise in turn a base frame 217 with lateral mounting elements or runners 218, 219 which rest on the parallel travel ways for supporting and moving the skids along the tank.

The system for overturning and immersion of the body on a skid is at least partly advantageously similar to that previously described for the first embodiment and comprises on each skid 211 a support 220 for the body which is rigidly connected to a shaft 221 supported above the base frame 217 transversely with respect to the skid so as to be rotatable about an overturning axis 222 which is transverse to the transportation line.

At least one motor unit 223 is arranged on the outside of the tank along a lateral edge of the tank and is provided with coupling means which comprise a coupling element 224 for connection together with a complementary coupling element 225 of the shaft 221 of the skid. In this case also, the coupling means may be designed so as to engaged with each other when they move towards each other along a predetermined direction.

Differently from the preceding embodiments, the tank 213 is longer and the body undergoing treatment may also be displaced horizontally during immersion or also perform complex emersion and immersion movements combined with displacements.

For this purpose, the motor unit 223 is not fixed, but is movable along a trajectory parallel to the travel way so as to follow during engagement the shaft of the skid which slides along the travel ways. For this purpose, the motor unit is advantageously supported by a lateral transportation system 260 which may move the motor unit along the edge of the tank in a direction parallel and synchronized with the movement of the system for transporting the skid along the tank.

Advantageously, as shown in FIG. 11, the motor units 223 may be at least two in number, arranged spaced along a circular path, so that, at the end of an active path of a motor unit between a position for engagement with a skid (shown in solid lines in FIG. 11) and a release position (shown in broken lines with the body upright in FIG. 11) another motor unit is already in the engagement position for the next incoming skid. In the case where the motor units comprise electric motors the electric power supply may for example be supplied to the motor unit by means of sliding contacts.

Alternatively, the motor units may also be connected mechanically (by means of suitable known drives allowing movement thereof) to motors fixed on the ground.

As can be clearly seen in FIG. 12, the lateral conveyor 260 may comprise an endless chain conveyor with a drive chain 261 which is driven by a motor 262 and with carriages 263 sliding along suitable guides and supporting the motor units 263. As can be seen again with reference to FIG. 12, the upper and lower guide and chain sections may be laterally staggered with respect to each other so that the motor unit which travels along the upper active section is moved towards the skid line, while the motor unit which travels along the lower return section is moved away from the skid line.

The approach or separation movement may also be used to engage the motor unit with the shaft for overturning a skid, in addition to or instead of the horizontal movement in the direction parallel to the direction of movement of the skids. The movement due to raising or lowering of the motor units between the two outgoing and return sections of the conveyor 260 may also be used for engagement and disengagement.

Depending on the approach movement chosen for engagement, the coupling elements may be similar to those described with reference to either one of the preceding embodiments and therefore will not be further described or illustrated here in detail.

In order to prevent uncontrolled rotation of the overturning shaft when the shaft is not engaged with the motor unit, a device for locking rotation of the shaft may be advantageously provided, as already described above. Disabling of the device may be again be performed by means of the movement for engagement with the motor unit, in a manner similar to that already described above. Any disabling cam must advantageously be displaced together with the motor unit.

During operation of the plant, a skid arriving in the engagement position at the start of the tank 213 will be engaged by the motor unit arriving on the conveyor 260 and the body will be rotated and if necessary moved for treatment, also with one or more emersion movements during travel towards the other end of the tank.

When the other end of the tank is reached, the body will be brought back into the upper transportation position, the skid will be disengaged from the overturning motor unit and the skid may continue for any successive treatment operations.

Figure 13:
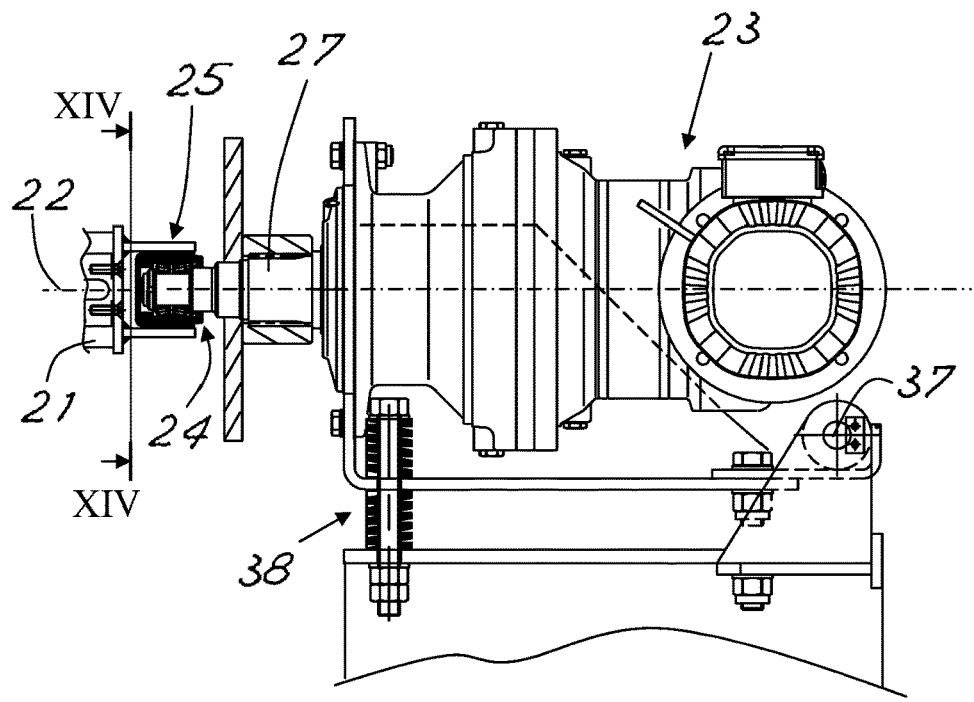
FIG. 13 shows a schematic, partially sectioned, side elevation view of a variation of embodiment of the coupling and rotation device.
Figure 14:
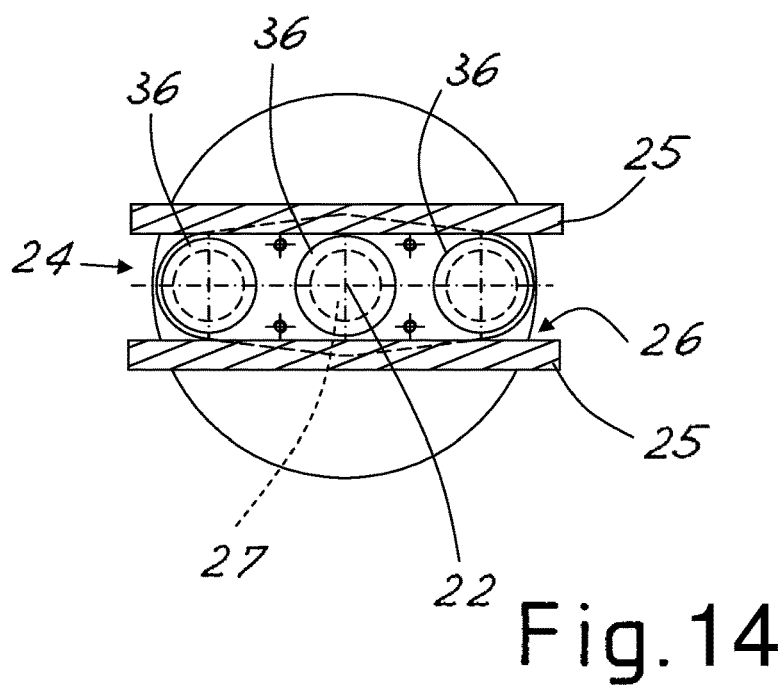
FIG. 14 shows in schematic form a cross-section along the line XIV-XIV of FIG. 13.

FIGS. 13 and 14 show an advantageous embodiment of the elements for coupling together the rotating shaft on the skid and the rotational motor. According to this embodiment, the coupling elements comprise surfaces for relative travel with idle rollers 36 arranged so as to roll during engagement of the coupling elements with each other. Preferably the rollers are situated on the coupling element which is inserted inside the groove of the other coupling element, and, advantageously, may have axes of rotation parallel to the axis of rotation of the coupling. The rollers allow easier sliding of one coupling element inside the other one.

This also allows easier self-alignment of the axes of rotation of the shaft and motor during rotation. In fact, in the same way as for the coupling systems described further above, during rotation a slight misalignment of the axes is corrected because this misalignment may cause automatically a slight displacement of one coupling element inside the other one until alignment occurs. Owing to the use of sliding surfaces with less friction, this occurs with greater precision and speed. The use of rollers on one of the two coupling elements therefore also improves alignment. The motor may also be mounted so as to have a slight spring action in the vertical direction and be adjustable position-wise, with for example a hinge at 37 and a spring unit 38.

Moreover, a suitable end-of-travel stop along the transportation line may detect the skid and motor alignment position, as may be now easily imagined by the person skilled in the art.

As shown in FIG. 13, advantageously the rollers may consist of three rollers arranged alongside each other, one arranged in alignment with the axis of rotation of the coupling element on which it is mounted and the other two symmetrically on either side of the first roller.

At this point it is clear how the predefined objects have been achieved.

It can be clearly seen from the figures that the treatment tank may be also only slightly greater than the size of the tanks to be treated, laterally requiring only a small amount of play between walls of the tank and side walls of the body and at the front and the rear only space to allow the circular movement for overturning the body and, if applicable as in FIG. 11, for the displacement movement with the body immersed. The quantity of treatment liquid may therefore be very limited (with a reduction for example of about 15% compared to most conventional systems). Furthermore, a plant according to the invention allows a dimensional reduction widthwise which may for example equal to about 25% compared to plants with body immersion arms and/or elevators.

The skids constitute, for all intents and purposes, both the transportation means and the body overturning means and therefore both the conventional skid and the conventional transportation carriage used in the prior art are eliminated.

The skids may be designed with only mechanical members (not requiring for example electrical or electronic devices) and therefore may be used for transporting bodies not only within the pre-treatment and cataphoresis plant, but also in the downstream drying and polymerization ovens.

Moreover, the transportation and overturning system remains entirely outside of the vertical axis of the tank and may be easily protected against contact with the treatment liquids.

Since the transportation system is not situated along the vertical axis of the tank, it is also possible to avoid any contamination of the liquid due to any impurities which are transported by the plant or which may fall from the transportation system owing to wear of the moving parts.

The system is moreover very simple and has few moving parts, said parts having low production and maintenance costs.

Obviously the description above of an embodiment applying the innovative principles of the present invention is provided by way of example of these innovative principles and must therefore not be regarded as limiting the scope of the rights claimed herein.

For example, along the sections which do not coincide with the treatment tanks according to the invention, the skid transportation system may be of any different known type. It is also possible to easily imagine how the various embodiments described may be combined with each other in order to perform treatments which are complex and/or with immersion of a body in successive treatment tanks. The locking device and coupling means for motor unit and overturning shaft may also be different from that shown and include also "active" operating systems for example of an electrical, pneumatic or hydraulic nature. Obviously, the coupling elements described on the overturning shaft and the motor unit may also be interchanged.

The transportation line may also be designed with systems different from the motor-driven rollers on which the skids rest and slide. For example, other systems, such as linear motors or friction rollers, may be used, as may be now easily imagined by the person skilled in the art.

The invention claimed is:

1. A plant for dip-treatment of bodies, the plant comprising:
   at least one skid configured to support a body to be treated;
   at least one process liquid tank;
   a skid transportation line; and
   a system for overturning and immersing the body on the at least one skid which has been positioned above the at least one process liquid tank using the skid transportation line;
   wherein the skid transportation line comprises parallel travel ways arranged along an outside of lateral edges of the at least one process liquid tank,
   wherein the at least one skid comprises, on corresponding opposite sides, lateral mounting elements which rest on the travel ways for supporting and moving the at least one skid above the at least one process liquid tank,
   wherein the system for overturning and immersing the body comprises, on the at least one skid, a support for the body which is rigidly connected to a shaft arranged transverse to the skid transportation line, and which is configured to rotate about an axis so as to overturn the body between a first upper advancing position and a second lower position immersed inside the at least one process liquid tank,
   wherein the system for overturning and immersing the body further comprises a motor unit configured to control rotation of the shaft, which is arranged not on the at least one skid, but on the outside of the at least one process liquid tank along one of the lateral edges of the at least one process liquid tank,
   wherein the motor unit and the shaft are configured to be coupled together by a first coupling element on the at least one skid and connected to the shaft, and a second coupling element on the motor unit,
   wherein the first and second coupling elements are configured to engage with each other, so as to be rotationally locked together, when moved toward each other from a predetermined direction,
   wherein the predetermined direction is transverse to the axis of rotation, and
   wherein the rotationally locked first and second coupling elements transmit rotational movement from the motor unit to the shaft.

2. The plant of claim 1, wherein the first coupling element comprises a seat open in the predetermined direction transverse to the axis of rotation so as to form entry/exit channel, and
   wherein the second coupling element comprises an insert configured to enter into the channel along the predetermined direction.

3. The plant of claim 1, wherein the predetermined direction is a direction parallel to movement of the at least one skid on the travel ways.

4. The plant of claim 1, further comprising at least two travel ways on each side of the at least one process liquid tank arranged in parallel and one above the other so as to form a pair of upper travel ways and a pair of lower travel ways for supporting and moving the at least one skid above the at least one process liquid tank, and
   wherein the at least two travel ways are configured to move vertically so as to alternately align the pair of lower travel ways or the pair of upper travel ways with entry sections and exit sections of the skid transportation line situated upstream and downstream of the at least one process liquid tank.

5. The plant of claim 1, wherein the predetermined direction is a vertical direction of movement of the travel ways.

6. The plant of claim 1, wherein the motor unit is configured to move along a path parallel to the travel ways so as to follow during engagement the shaft of the at least one skid travelling over the at least one process liquid tank along the travel ways.

7. The plant of claim 1, wherein the motor unit is supported by a lateral transportation system which may displace the motor unit along the at least one process liquid tank in a direction parallel to and synchronized with movement of the at least one skid along the at least one process liquid tank.

8. The plant of claim 1, further comprising at least two motor units, wherein the motor units are spaced along an associated annular movement path alongside the at least one process liquid tank so that, at an end of an active path of a first motor unit between a skid coupling position and a release position which are spaced along the travel ways, a second motor unit reaches a coupling position for engagement with the shaft of a following skid.

9. The plant of claim 1, wherein the first and second coupling elements comprise surfaces with idle rollers for a relative sliding movement in the predetermined direction.

10. The plant of claim 1, wherein the at least one skid has a base frame with an H-shaped form in plan view,
    wherein sides of the 'H' form the lateral mounting elements, and
    wherein a cross-piece of the 'H' comprises the rotatable shaft, from which V-shaped elements project which form the support for the body.

11. The plant of claim 1, wherein the second coupling element comprises a seat open in the predetermined direction transverse to the axis of rotation so as to form entry/exit channel, and
    wherein the first coupling element comprises an insert configured to enter into the channel along the predetermined direction.

12. The plant of claim 1, further comprising:
    at least two travel ways on each side of the at least one process liquid tank;
    wherein the at least two travel ways on each side of the at least one process liquid tank are configured to form a pair of upper travel ways and a pair of lower travel ways for supporting and moving the at least one skid above the at least one process liquid tank.

13. The plant of claim 12, wherein the at least two travel ways on each side of the at least one process liquid tank are configured to move vertically so as to align alternately the pair of lower travel ways or the pair of upper travel ways with entry sections of the skid transportation line situated upstream of the at least one process liquid tank.

14. The plant of claim 12, wherein the at least two travel ways on each side of the at least one process liquid tank are configured to move vertically so as to align alternately the pair of lower travel ways or the pair of upper travel ways with exit sections of the skid transportation line situated downstream of the at least one process liquid tank.

15. The plant of claim 1, wherein the first coupling element comprises surfaces with idle rollers for a relative sliding movement in the predetermined direction.

16. The plant of claim 1, wherein the second coupling element comprises surfaces with idle rollers for a relative sliding movement in the predetermined direction.

17. A plant for dip-treatment of bodies, the plant comprising:
   at least one skid configured to support a body to be treated;
   at least one process liquid tank;
   a skid transportation line; and
   a system for overturning and immersing the body on the at least one skid, when the body is positioned above the at least one process liquid tank;
   wherein the skid transportation line comprises travel ways arranged along an outside of lateral edges of the at least one process liquid tank,
   wherein the at least one skid comprises, on opposite sides, lateral mounting elements that rest on the travel ways for supporting and moving the at least one skid above the at least one process liquid tank,
   wherein the system for overturning and immersing the body comprises, on the at least one skid, a support for the body that is rigidly connected to a shaft arranged transverse to the skid transportation line, and which is configured to rotate about an axis so as to overturn the body between a first position not immersed inside the at least one process liquid tank and a second position immersed inside the at least one process liquid tank,
   wherein the system for overturning and immersing the body further comprises a motor unit configured to control rotation of the shaft, the motor unit arranged outside of the at least one process liquid tank along one of the lateral edges of the at least one process liquid tank,
   wherein the motor unit and the shaft are configured to be coupled together by a first coupling element on the at least one skid and a second coupling element on the motor unit, and
   wherein the first and second coupling elements are configured to engage with each other so as to be rotationally locked together when moved toward each other from a direction that is transverse to the axis of rotation.

18. The plant of claim 17, further comprising:
   at least two travel ways on each side of the at least one process liquid tank;
   wherein the at least two travel ways on each side of the at least one process liquid tank are configured to form a pair of upper travel ways and a pair of lower travel ways for supporting and moving the at least one skid above the at least one process liquid tank.

19. The plant of claim 18, wherein the at least two travel ways on each side of the at least one process liquid tank are configured to move vertically so as to alternately align the pair of lower travel ways or the pair of upper travel ways with entry sections of the skid transportation line situated upstream of the at least one process liquid tank.

20. The plant of claim 18, wherein the at least two travel ways on each side of the at least one process liquid tank are configured to move vertically so as to alternately align the pair of lower travel ways or the pair of upper travel ways with exit sections of the skid transportation line situated downstream of the at least one process liquid tank.

* * * * *